(12) United States Patent
Gaibler

(10) Patent No.: US 6,196,555 B1
(45) Date of Patent: Mar. 6, 2001

(54) ROLL-RESISTANT HYDRAULIC SUSPENSION SYSTEM, KIT AND METHOD FOR LOAD HANDLING VEHICLES

(75) Inventor: Dennis W. Gaibler, Portland, OR (US)

(73) Assignee: Atlas Copco Wagner, Inc., Portland, OR (US)

(*) Notice: Subject to any disclaimer, the term of this patent is extended or adjusted under 35 U.S.C. 154(b) by 0 days.

(21) Appl. No.: 09/238,690

(22) Filed: Jan. 27, 1999

Related U.S. Application Data
(60) Provisional application No. 60/072,781, filed on Jan. 27, 1998.

(51) Int. Cl.[7] ............................................. B60G 21/073
(52) U.S. Cl. ........................... 280/6.154; 280/6.157; 280/124.161
(58) Field of Search .................... 280/5.506, 5.514, 280/6.15, 6.154, 6.157, 6.16, 124.159, 124.161, 124.16

(56) References Cited

U.S. PATENT DOCUMENTS

| | | | |
|---|---|---|---|
| 2,959,426 | * 11/1960 | Augusin . | |
| 2,964,333 | 12/1960 | Trevaskis . | |
| 3,550,993 | * 12/1970 | Peiffer . | |
| 4,238,128 | * 12/1980 | McKee | 280/703 |
| 4,591,185 | * 5/1986 | Natsume et al. | 280/707 |
| 4,593,931 | 6/1986 | Shiratori et al. . | |
| 4,611,815 | * 9/1986 | Sasage et al. | 280/6.12 |
| 4,616,847 | * 10/1986 | Kanai et al. | 280/707 |
| 4,822,063 | * 4/1989 | Yopp et al. | 280/840 |
| 4,971,353 | 11/1990 | Buma et al. . | |
| 5,047,938 | * 9/1991 | Yokote et al. | 701/37 |
| 5,261,691 | * 11/1993 | Laichinger et al. | 280/714 |
| 5,443,283 | 8/1995 | Hawkins et al. . | |
| 5,484,162 | * 1/1996 | Kanoh et al. . | |
| 5,538,266 | * 7/1996 | Martin et al. | 280/6.12 |
| 5,642,282 | 6/1997 | Sonehara . | |

* cited by examiner

Primary Examiner—Paul N. Dickson
(74) Attorney, Agent, or Firm—Klarquist, Sparkman, Campbell, Leigh & Whinston, LLP

(57) ABSTRACT

A suspension system for a vehicle includes a first hydraulic circuit, a second hydraulic circuit and a connection between the first hydraulic and the second hydraulic circuit. The first hydraulic circuit is operatively coupled to a first side of the vehicle, and is selectively controllable to move the first side of the vehicle. The second hydraulic circuit is operatively coupled to a second side of the vehicle, and is selectively controllable to move the second side of the vehicle. The first hydraulic circuit and the second hydraulic circuit operate together in a first mode when the connection between the first hydraulic circuit and the second hydraulic circuit is opened to move the first and second sides of the vehicle in a same direction. The first hydraulic circuit and the second hydraulic circuit operate independently of each other in a second mode when the connection is closed.

14 Claims, 7 Drawing Sheets

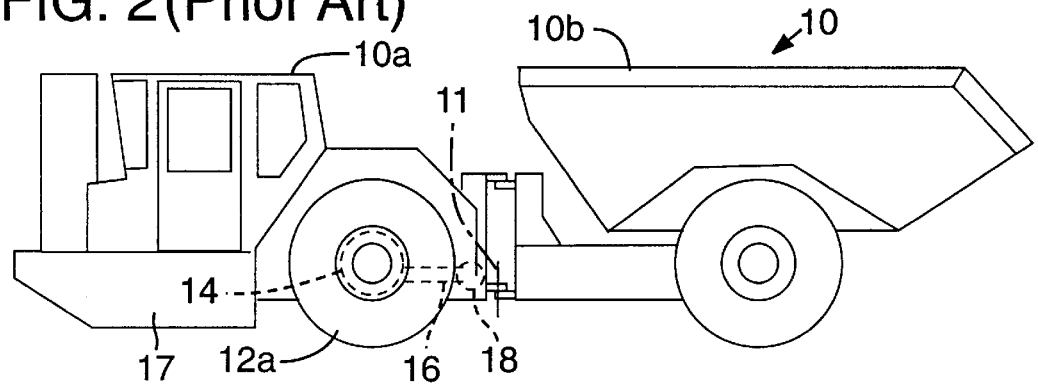
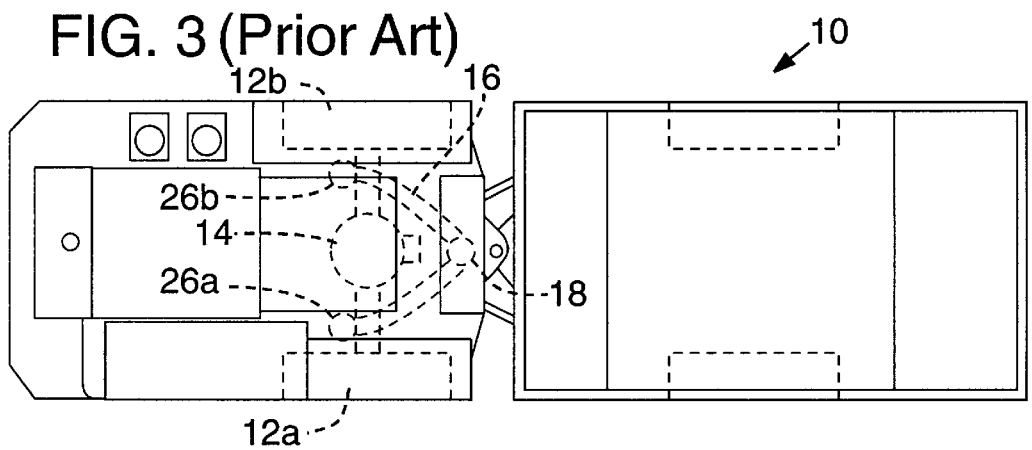
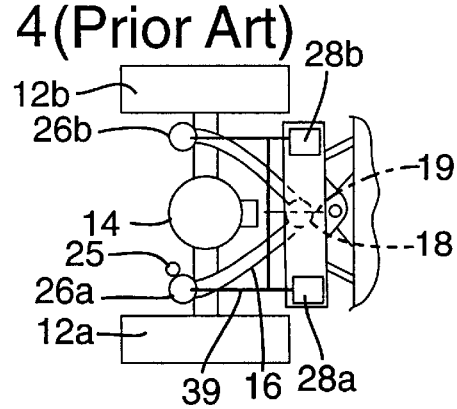
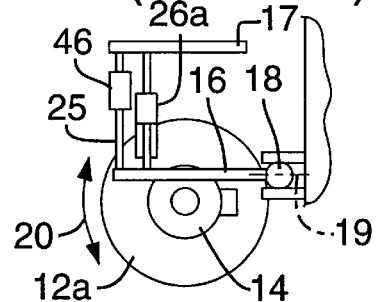
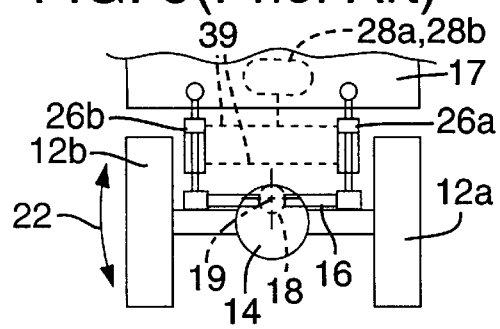
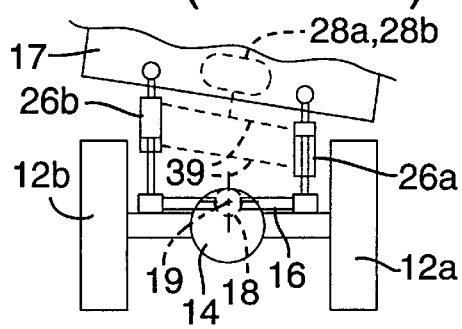

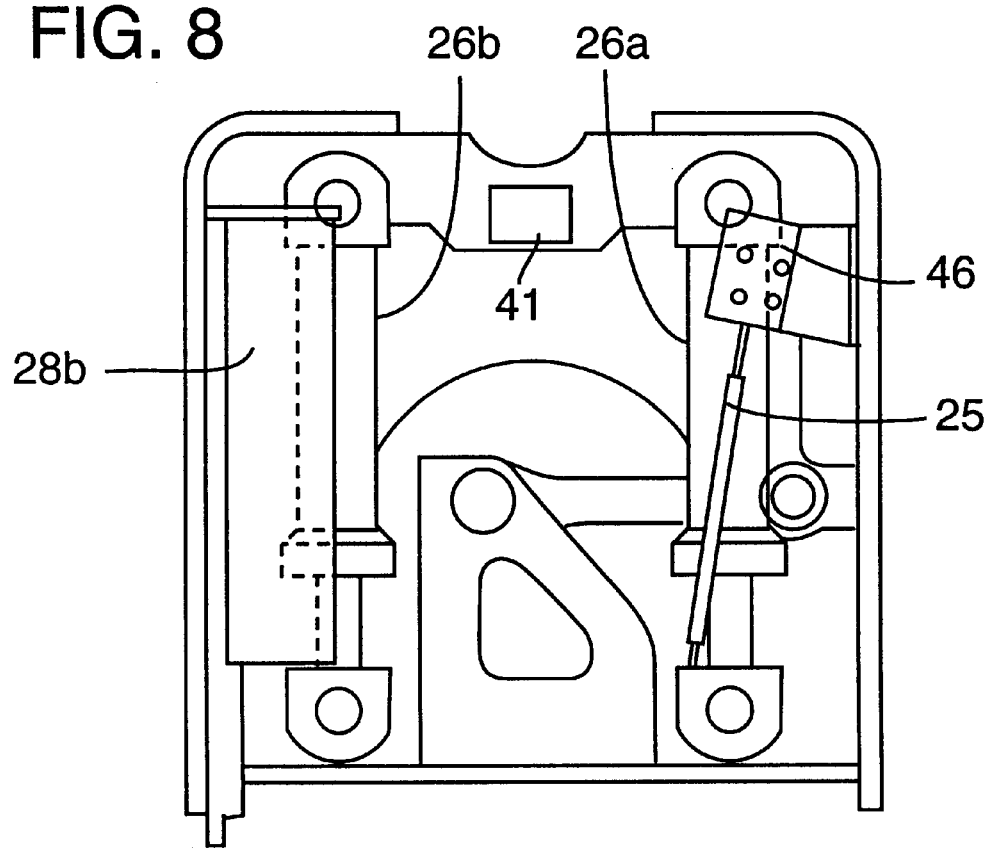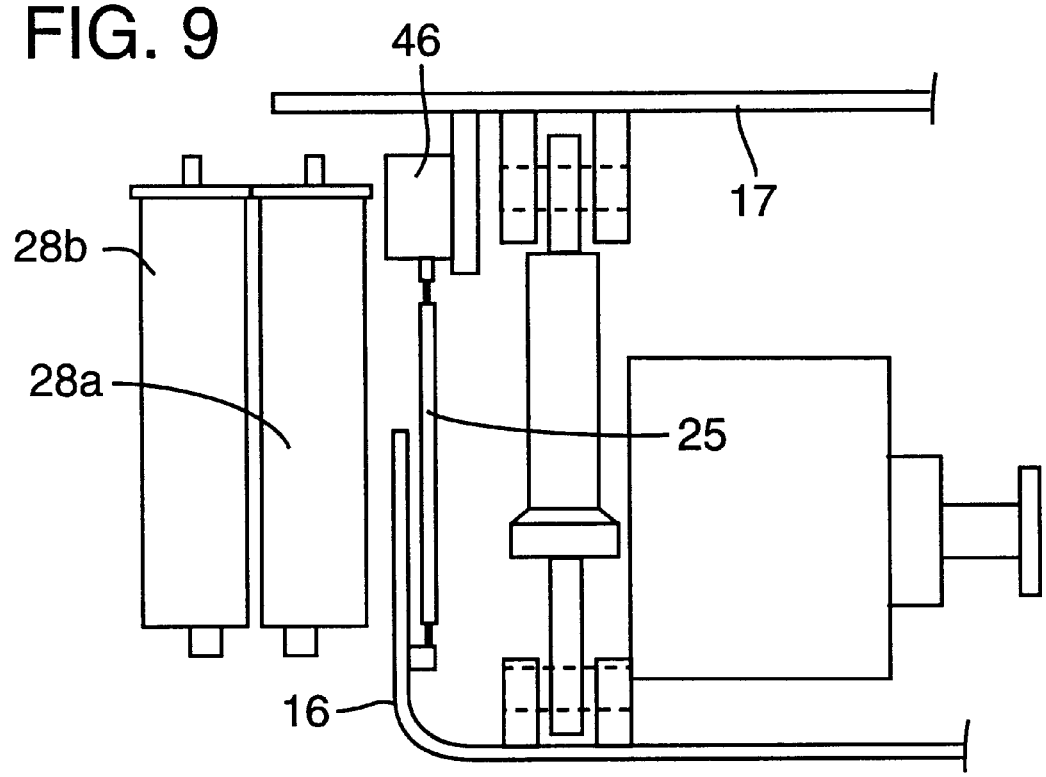

ROLL-RESISTANT HYDRAULIC SUSPENSION SYSTEM, KIT AND METHOD FOR LOAD HANDLING VEHICLES

RELATED APPLICATION

This application claims the benefit of U.S. Provisional Patent Application No. 60/072,781, filed Jan. 27, 1998.

BACKGROUND OF THE INVENTION

1. Field of the Invention

The present invention relates to a roll-resistant hydraulic suspension system for a load handling vehicle.

2. Description of Related Art

In recent years, large load carrying vehicles, such as ore carriers, have become even larger so that they carry increasingly heavy loads. At the same time, such vehicles have become equipped with larger engines, giving the vehicles the capacity to operate at relatively high speeds. These greater loads and higher speeds have accentuated a shock-dampening problem. In particular, it has been found that such vehicles when heavily loaded and operated at high speeds on rough terrain, have a tendency to roll or tilt to one side, especially in turns.

More specifically, FIGS. 1–7 and 10 depict schematically a conventional heavy load carrying vehicle 10, such as an articulated underground mining vehicle for carrying heavy ore loads, for which the present invention is intended to be used. As best shown in FIG. 1, the vehicle includes a front vehicle or tractor portion 10a, and a rear load-carrying portion 10b interconnected at a steerable vertical hinge axis 11.

Front vehicle portion 10a includes a pair of wheels 12a, 12b (FIG. 3) mounted at the opposite ends of an axle 14 carried by a generally V-shaped subframe 16. Subframe 16 is connected to the main vehicle chassis 17 (see FIGS. 3–7) at a spherical bearing 18 such that the subframe 16 is effectively cantilevered forward from and beneath chassis 17. A pair of hydraulic suspension cylinders 26a, 26b interconnect the free ends of the subframe 16 and main chassis 17 to isolate the chassis from shock loads transmitted to the subframe from the ground and to control the height of the chassis 17 above the subframe. By adjusting the hydraulic pressure and/or volume at the top ends of cylinders 26a and 26b, the height of the chassis 17 above the subframe 16 can be adjusted. Such height adjustments are numerous during operation of the vehicle because of the large weight difference between a loaded and unloaded vehicle and the need to maintain appropriate clearance between the subframe 16 and chassis 17 during all phases of loading and unloading of the vehicle.

Because of the spherical bearing-mounting of subframe 16 relative to chassis 17, the subframe16, as viewed in elevation (FIG. 5), can pivot vertically in the directions of arrow 20 about spherical bearing 18. Similarly, as viewed from the front, as shown in FIGS. 6 and 7, any force encountered by one wheel, such as wheel 12a traveling over a rock, urges that wheel upwardly relative to the chassis, causing axle 14 to pivot in the directions of arrows 22 about the longitudinal axis 19 of the vehicle through spherical bearing 18, thus urging opposite wheel 12b downwardly relative to the chassis about the same axis. Suspension cylinders 26a and 26b when hydraulically-coupled to accumulators 28a, 28b are intended to dampen such vertical movements of the axle and subframe caused by the vehicle traveling over rough, uneven terrain.

One known hydraulic circuit 39 for such suspension systems is shown schematically in FIG. 10. The pressure sides of both hydraulic cylinders 26a, 26b are continuously hydraulically interconnected and share common pressure from accumulators 28a, 28b though hydraulic lines 43. Similarly, the exhaust sides of both cylinders are hydraulically interconnected through hydraulic lines 45. The system also includes a pressure bleed down valve 60 for de-pressurizing the system for maintenance.

A suspension height sensor 25 (see FIGS. 8 and 9) commands the leveling valve 46. When height sensor 25 senses that the height of the vehicle's chassis relative to its subframe is at an optimal height, leveling valve 46 is spring-centered in its neutral position shown in FIG. 10 to isolate the hydraulic lines 43 from pressure source 54, thereby maintaining the same pressure and volume in the pressure sides of both hydraulic cylinders 26a, 26b to maintain the optimal height.

Should the sensed height of the vehicle be too high, the leveling valve 46 is mechanically-commanded to the left in FIG. 10 to a position that connects hydraulic lines 43 with storage tank 56, thereby allowing fluid in lines 43 to vent to the tank 56 and reducing pressure at the top ends of both cylinders and in accumulators 28a, 28b to lower the chassis relative to the subframe until the chassis is at the desired height as sensed by the height sensor 25, at which point valve 46 returns to its spring-centered neutral position.

Should the sensed height of the vehicle be too low, the leveling valve 46 is mechanically-commanded to the right in FIG. 10 to a position that connects hydraulic lines 43 with a hydraulic pressure source 54, allowing hydraulic fluid under pressure to be transmitted thorough hydraulic lines 43 to the top ends of both cylinders 26a, 26b and to the accumulators 28a, 28b. This causes the cylinders to extend to raise the chassis to the desired level as sensed by the height sensor 25, at which position leveling valve 46 returns to its spring-centered neutral position. Thus, although pressure in the hydraulic cylinders and accumulators, and thus the height of the chassis, can be modulated with the existing circuit, the hydraulic cylinders 26a, 26b and the respective accumulators 28a, 28b remain hydraulically interconnected during normal operation of the vehicle.

To illustrate, when a heavily loaded such vehicle turns at high speed, or when one wheel hits a bump, the force generated has a tendency to cause the chassis to roll or tilt to one side relative to the axle and subframe (see FIG. 7). With a conventional hydraulic circuit for the suspension system, this tendency to roll is accentuated because the pressure sides of both suspension cylinders are hydraulically interconnected and share a common source of pressure fluid, such as accumulators 28a, 28b. Similarly, the exhaust sides of both cylinders are interconnected. Thus, for example and as shown in FIG. 7, when chassis 17 begins to roll to the right (or the right wheel 12b moves upward relative to the chassis) as shown, it tends to retract cylinder 26b, displacing fluid from the pressure side of that cylinder 26b. This displaced fluid is transmitted to the pressure or top side of the other suspension cylinder 26b, which tends to extend that cylinder as shown, and thereby accentuating the tendency of the chassis to roll to the right.

U.S. Pat. No. 5,443,283 to Hawkins discloses an independent swing arm suspension with one leveling valve for each wheel. In the Hawkins suspension, each wheel is independently suspended at all times and requires its own leveling valve. Thus, the two cylinders corresponding to each of an opposing pair of wheels can not be operated together to adjust the height of the vehicle uniformly.

U.S. Pat. No. 4,971,353 to Buma, U.S. Pat. No. 4,593,931 to Shiratori, and U.S. Pat. No. 5,642,282 disclose various independent suspension systems. U.S. Pat. No. 2,964,333 discloses a conventional leveling valve construction.

None of these prior systems reflects an appreciation of the roll problem. The suspension system having a hydraulic circuit according to the present invention, described below with reference to FIGS. 8, 9, and 11–13 overcomes this problem by resisting the tendency of the chassis to roll relative to the subframe.

SUMMARY OF THE INVENTION

Fulfilling the foregoing need is the primary objective of the invention. More specific objectives of the invention are to provide a roll-resistant hydraulic suspension system for a load handling vehicle in which the hydraulic circuit:

(1) hydraulically isolates from one another the hydraulic suspension cylinders suspending opposite sides of the vehicle chassis from a common axle during normal vehicle operation to resist any tendency of the chassis to roll relative to the axle and subframe;

(2) hydraulically interconnects the hydraulic suspension cylinders to control the height of the chassis above the axle and subframe when a height sensor senses that the chassis is too high or too low relative to the axle;

(3) may be easily retrofitted into existing load handling vehicle suspension systems;

(4) works equally well with single or multiple axle suspension systems;

(5) may be easily and inexpensively constructed with known materials and construction techniques; and/or (6) provides a low cost, easy to maintain, reliable, relatively simple and inexpensive solution to the known problems of load handling vehicle hydraulic suspension systems.

The invention is an improved hydraulic suspension cylinder circuit for use with the basic components of a conventional load handling vehicle hydraulic suspension system that solves the roll problem by isolating the hydraulic pressure fluid used by the opposite suspension cylinders from each other when the vehicle chassis is at a predetermined height relative to its subframe. However, the present circuit also modulates hydraulic fluid pressure to both cylinders together when the mechanically-sensed height of the vehicles chassis relative to its subframe is either too high or too low, so that the chassis can relevel itself relative to the subframe.

According to the invention, this suspension system includes a first hydraulic circuit, a second hydraulic circuit and a connection between the first hydraulic circuit and the second hydraulic circuit. The first hydraulic circuit is operatively coupled to a first side of the vehicle, and is selectively controllable to move the first side of the vehicle. Similarly, the second hydraulic circuit is operatively coupled to a second side of the vehicle, and is selectively controllable to move the second side of the vehicle. The first hydraulic circuit and the second hydraulic circuit operate together in a first mode when the connection between the first and second hydraulic circuits is opened to move the first and second sides of the vehicle in the same direction. The first hydraulic circuit and the second hydraulic circuit operate independently of each other in a second mode when the connection is closed.

BRIEF DESCRIPTION OF THE DRAWINGS

FIG. 2 is a schematic side elevational view of the prior art vehicle of FIG. 1.

FIG. 3 is a schematic top plan view of the prior art vehicle of FIG. 1.

FIG. 4 is a schematic top plan view of the prior art suspension system of FIG. 1.

FIG. 5 is a schematic side elevational view of the prior art suspension system of FIG. 1.

FIG. 6 is a schematic front elevational view of the prior art suspension system of FIG. 1 with the vehicle chassis in a level position.

FIG. 7 is a schematic front elevational view of the prior art suspension system of FIG. 1 with the vehicle chassis in a tilted position.

FIG. 8 is an enlarged front elevational view of a portion of the suspension system of the present invention.

FIG. 9 is an enlarged front elevational view of the portion of the suspension system of FIG. 8.

DETAILED DESCRIPTION OF PREFERRED EMBODIMENTS

Figure 1:
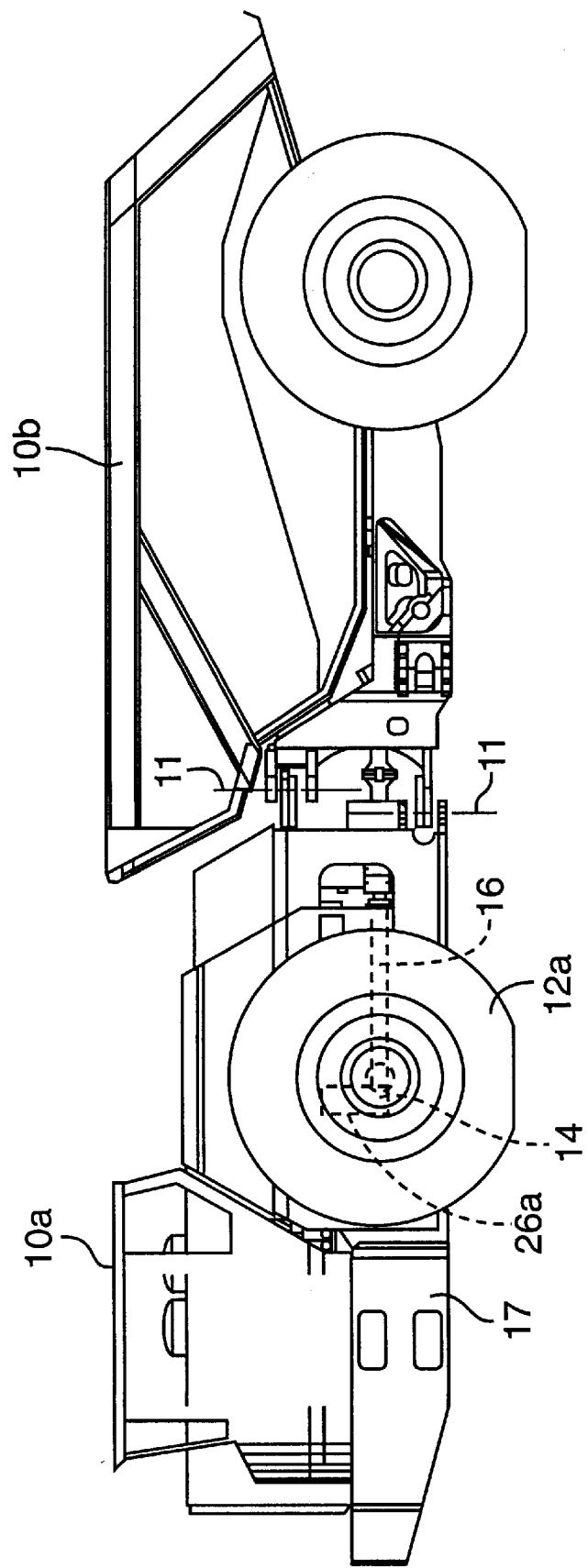
FIG. 1 is a side plan view of a conventional articulated load carrying vehicle having a conventional hydraulic suspension system installed.

The present invention is applicable to the same axle 14, wheels 12, V-shaped subframe 16, chassis 17, spherical bearing connection 18, cylinders 26a, 26b, accumulators 28a, 28b, leveling valve 46, tank 56, pressure source 54, and pressure bleed down valve 60 as known vehicle suspension systems and as previously described. The height sensor 25 of the present invention, as shown in FIGS. 8 and 9, is also the same as the height sensor in the known and described systems. The invention is a modification of the hydraulic suspension cylinder circuit previously described.

Figure 11:
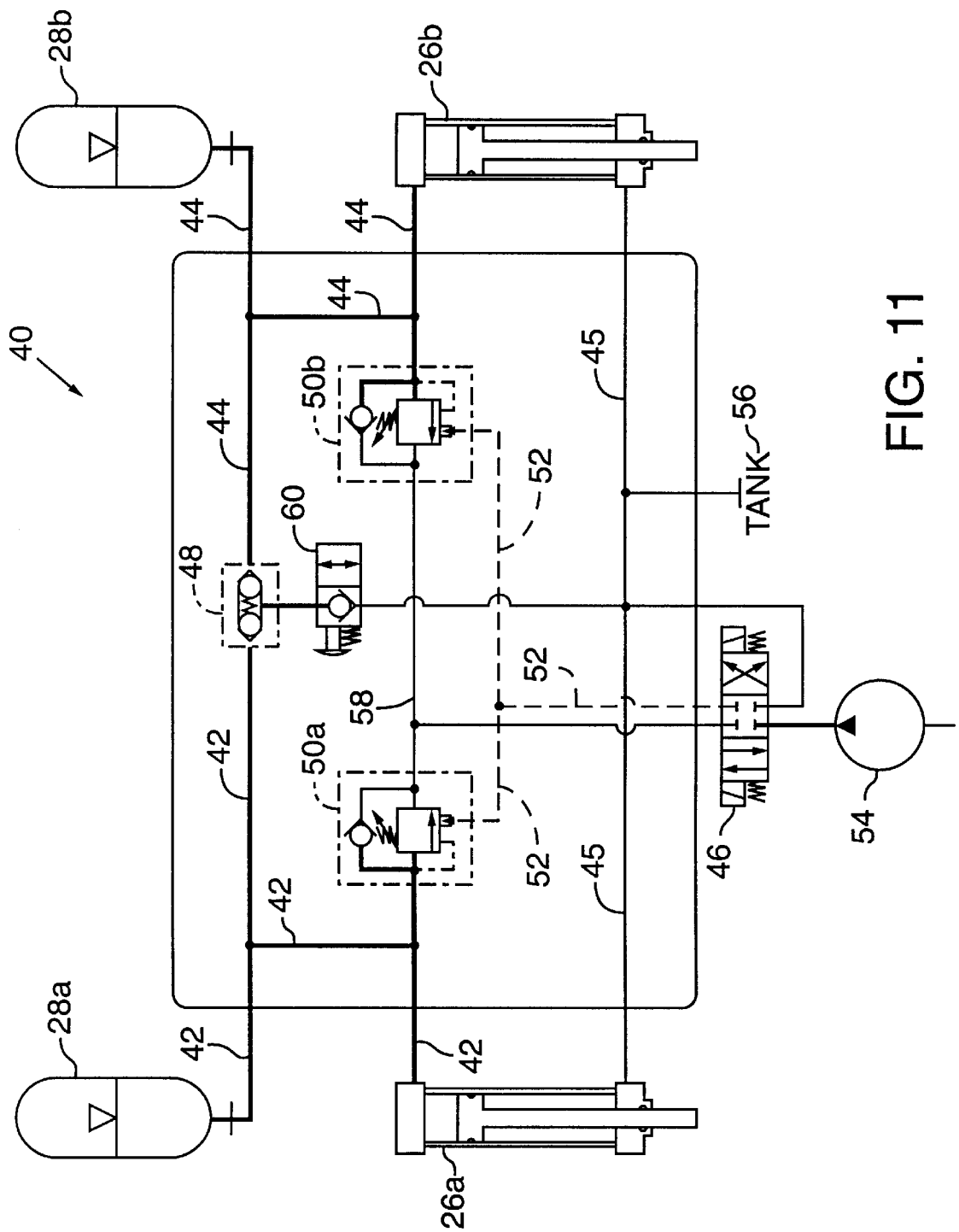
FIG. 11 is a schematic hydraulic circuit diagram of the hydraulic suspension circuit of the present invention, in its normal operating condition to isolate the suspension cylinder on one side of the vehicle from the suspension cylinder on the opposite side of the vehicle.
Figure 12:
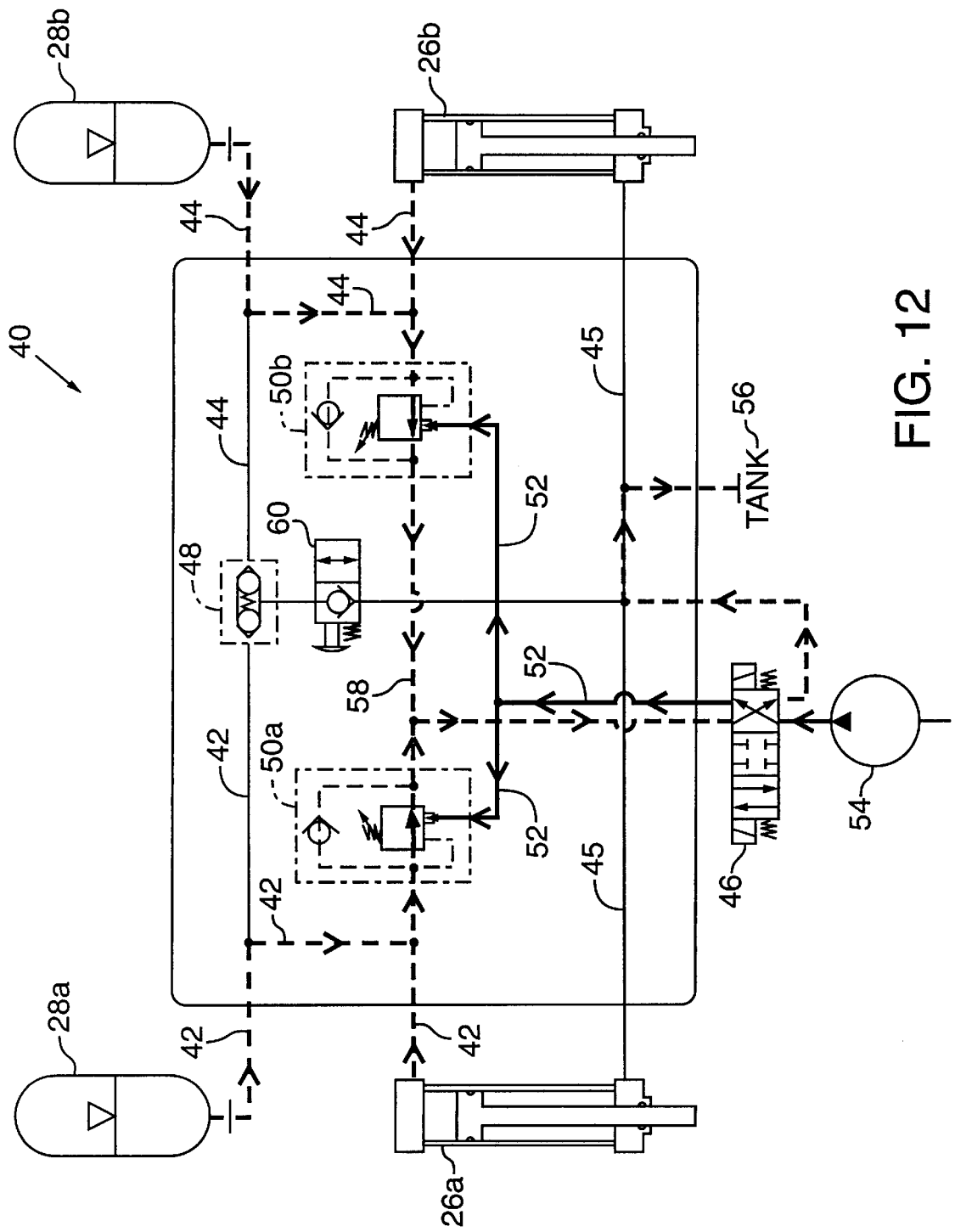
FIG. 12 is the schematic hydraulic circuit diagram of the hydraulic suspension circuit of FIG. 11 with the various hydraulic lines emphasized to illustrate operation of the circuit in its leveling mode when the sensed height of the chassis is too high.
Figure 13:
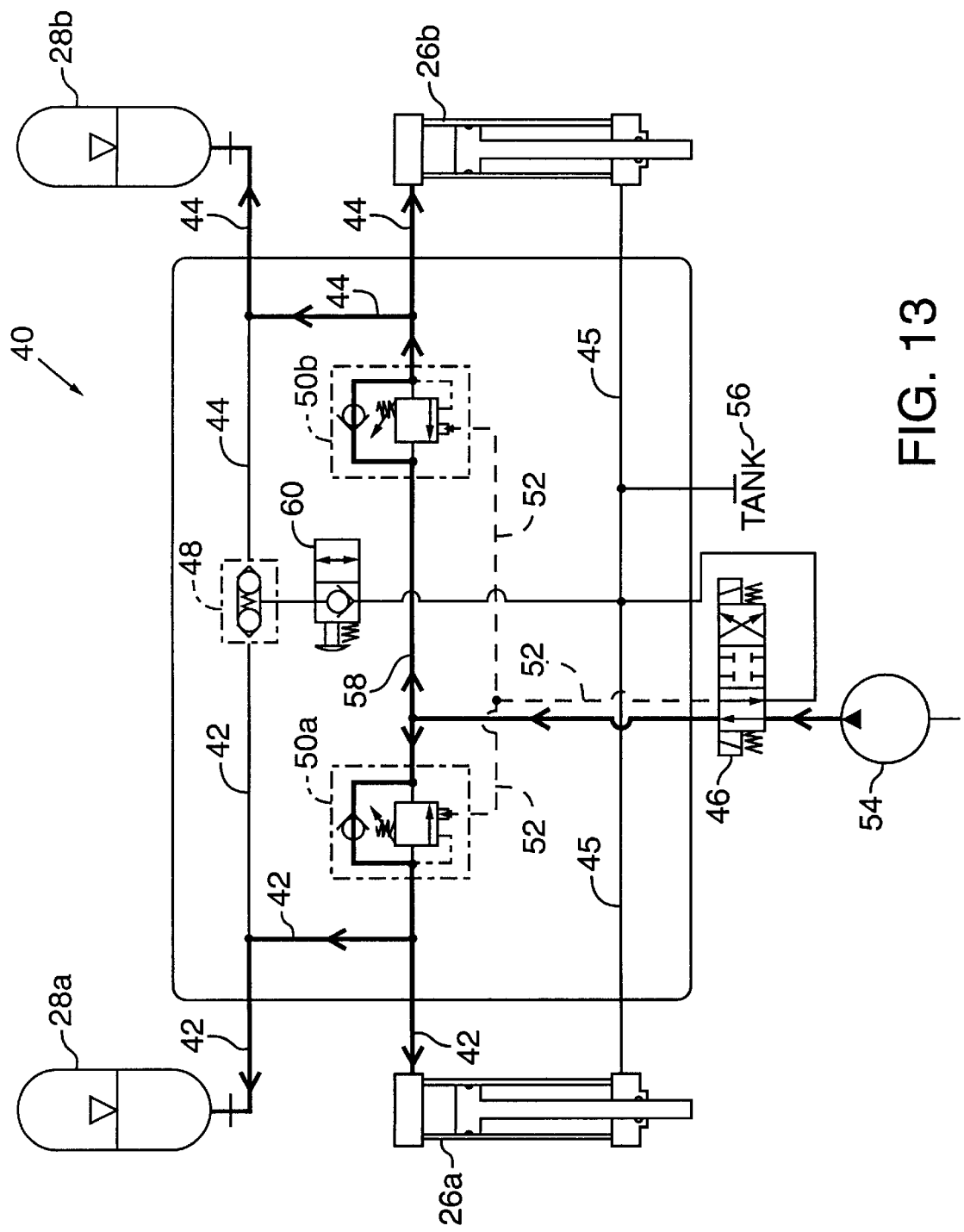
FIG. 13 is the schematic hydraulic circuit diagram of the hydraulic suspension circuit of FIG. 11 with the various hydraulic lines emphasized to illustrate operation of the circuit in its leveling mode when the sensed height of the chassis is too low.

The circuit 40, shown in FIGS. 11–13, solves the roll problem by isolating the hydraulic pressure fluid used by the two suspension cylinders 26a, 26b from each other when the vehicle chassis 17 is at a predetermined height relative to subframe 16 (i.e., in a second mode). However, the present system, as did prior systems, has the ability to modulate hydraulic fluid pressure to both cylinders 26a, 26b together (i.e., in a first mode) when the mechanically-sensed height of the vehicle's chassis relative to its subframe is either too high or too low, so that the chassis will relevel itself longitudinally relative to the subframe.

In particular, the circuit 40 of FIGS. 11–13 effectively hydraulically isolates the cylinders 26a, 26b from each other so that they operate independently during normal operation. In this mode, as shown in heavy lines in FIG. 11, a first accumulator 28a provides pressurized fluid to a first cylinder 26a through hydraulic line 42 (i.e., the first hydraulic circuit), and a second accumulator 28b provides pressurized fluid to a second cylinder 26b through hydraulic line 44 (i.e., the second hydraulic circuit) when the suspension height sensor 25 (FIGS. 8 and 9) for operating leveling valve 46, senses that the vehicle's chassis 17 is at a proper predetermined height above subframe 16. The two hydraulic lines 42, 44 are isolated from each other by back-to-back, or double, check valve 48 and normally closed counterbalance valves 50a, 50b. In this mode, the hydraulic suspension cylinders 26a, 26b operate independently of each other.

Thus an unbalanced loading of the cylinders, such as would occur by shock loading one wheel and thus one cylinder or by transmitting a greater force from the chassis to one cylinder than the other as in a turn, will not adversely impact the hydraulic fluid pressure in the opposite cylinder. Thus, for example, if pressure increases in the top end of cylinder 26b due to unequal loading of the chassis induced by a high-speed turn under heavy load, that high pressure is isolated from the top end of cylinder 26a by back-to-back check valve 48 and counterbalance valves 50a, 50b. Therefore the upward force urging cylinder 26b to retract and thus chassis 17 to roll is resisted solely by accumulator 28b.

If the suspension height sensor 25 indicates that the chassis 17 of the vehicle is too high above subframe 16, the suspension height sensor actuates leveling valve 46 to the left in FIG. 11 and, as shown in heavy lines in FIG. 12, pressurizes pilot line 52 leading from a fluid pressure source 54, such as a hydraulic pump, to counterbalance valves 50a, 50b, causing them to open. Opening these valves 50a, 50b allows cross communication between the cylinders and their accumulators to equalize the hydraulic fluid pressure in both cylinders 26a, 26b while at the same time reducing pressure at the top ends of both cylinders by opening hydraulic line 58 to tank 56, to lower the chassis relative to the subframe until the chassis is at the desired height as sensed by the suspension height sensor.

If the height sensor 25 indicates that the chassis 17 is too low relative to subframe 16, the height sensor actuates the leveling valve 46 to the right in FIG. 11, and as shown in heavy lines in FIG. 13, pressurizes hydraulic line 58 and allowing hydraulic fluid under pressure to be transmitted through the check valve portions of counterbalance valves 50a, 50b to increase the pressure equally in the top ends of cylinders 26a, 26b. This causes the cylinders to extend to raise the chassis to the desired level as sensed by the height sensor, at which point leveling valve 46 returns to its centered, closed or neutral position.

Figure 10:
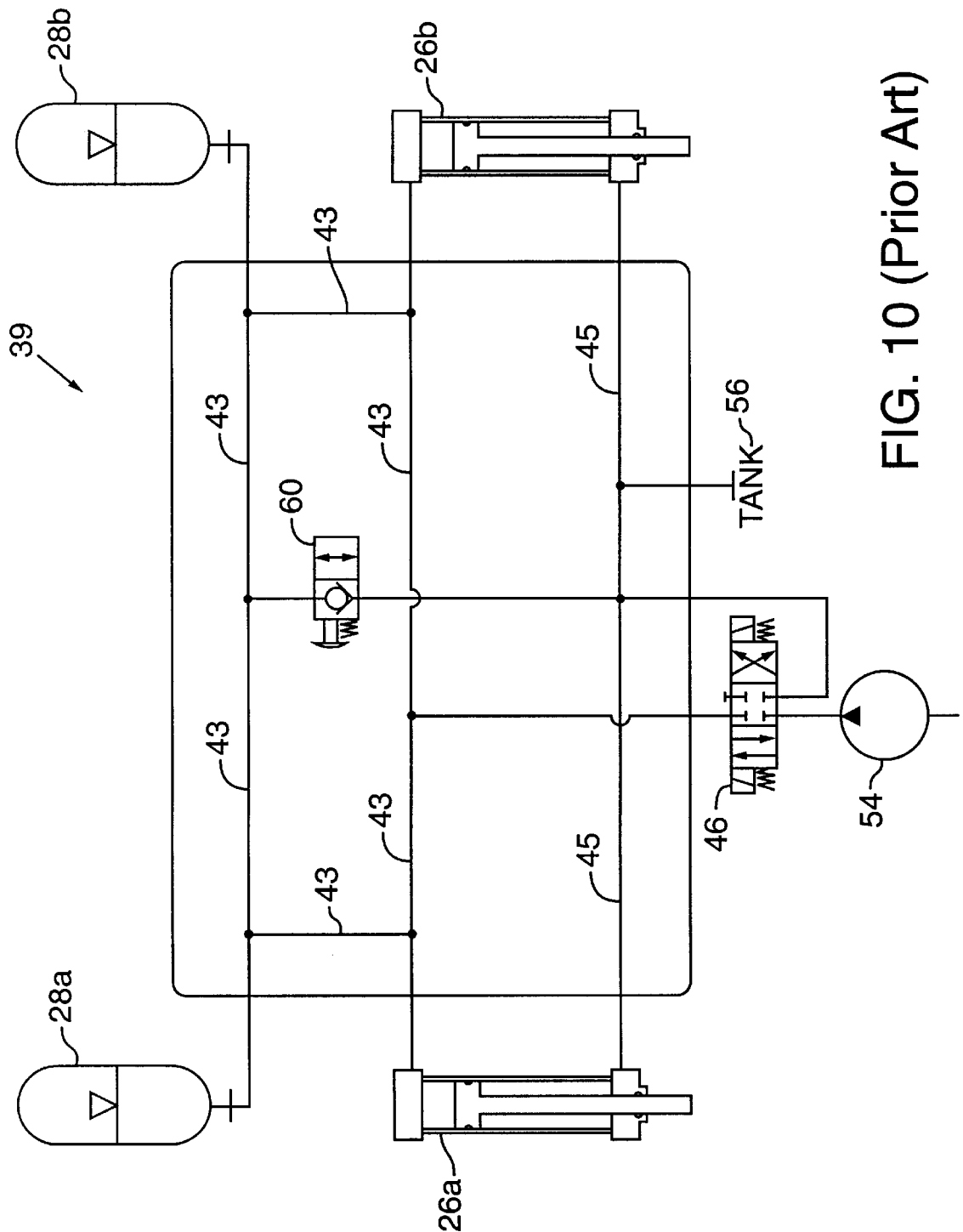
FIG. 10 is a schematic hydraulic circuit diagram of a typical prior art hydraulic suspension circuit as used with the hydraulic suspension system shown in FIGS. 4–7.

The above-described system may be readily constructed with commercially available methods and materials. For example, one known load handling vehicle having the basic components of the known hydraulic system is the model MT5000 50 Tonne four-wheel drive mine truck manufactured and sold by Atlas Copco Wagner, Inc. of Portland, Oreg., U.S.A. It includes the following components arranged to form the hydraulic circuit of FIG. 10:

| Component | Manufacturer/City | Part Number |
| --- | --- | --- |
| Hydraulic suspension cylinders 26a, 26b | Iowa Industrial Hydraulics/ Pocahontas, Iowa, USA | PN 5572659800 |

-continued

| Component | Manufacturer/City | Part Number |
| --- | --- | --- |
| Accumulators 28a, 28b | Parker Hannifin Corp -C.O.P.S/Mt. Prospect, Illinois, USA | PN 5540463400 |
| Hydraulic lines | Aeroquip/ Maumee, Ohio, USA | Various |
| Leveling valve 46 | Grosen Corp./ Minneapolis, Minnesota, USA | PN 5541018500 |
| Hydraulic pump 54 | Rexroth Corp./ Wooster, Ohio, USA | PN 5541044800 |
| Pressure bleed down valve 60 | Parker Hydraulics Valve Div./St. Louis, Missouri, USA | PN NV101K |
| Tank 56 | Atlas Copco Wagner, Inc./ Portland, Oregon, USA | PN 5572672500 |
| Suspension height sensor 25 | Atlas Copco Wagner, Inc./ Portland, Oregon, USA | Numerous components |

With the installation of the following commercially available components, the hydraulic system of the MT5000 Mine Truck can be retrofitted to include the hydraulic circuit of FIGS. 11–13, thereby permitting easy incorporation of the roll-resistant features of the present invention into existing known suspension systems:

| Component | Manufacturer/City | Part Number |
| --- | --- | --- |
| Counterbalance valves 50a, 50b | Sun Hydraulic Corp./ Sarasota, Florida, USA | PN CBEA-LIN-BCL |
| Back-to-back check valve 48 | Sun Hydraulic Corp./ Sarasota, Florida, USA | PN CDAD-XBN-ECI |
| Pilot line 52 | Aeroquip/ Maumee, Ohio, USA | Various |

In a preferred embodiment, at least the counterbalance valves 50a, 50b and the back-to-back check valve 48 are mounted to the vehicle on a common manifold 41 positioned approximately midway between the hydraulic suspension cylinders 26a, 26b (see FIG. 8).

Having described and illustrated the principles of the invention with reference to a preferred embodiment thereof, it should be apparent that this embodiment can be modified in arrangement and detail without departing from the principles of the invention. In view of the wide variety of vehicles and embodiments of hydraulic suspension systems to which the principles of the invention can be applied, it should be apparent that the disclosed embodiments of vehicles, and suspension system and circuit are illustrative only and should not be taken as limiting the scope of the invention. Rather, the claimed invention includes all such modifications as may come within the scope of the following claims and equivalents thereto.

What is claimed is:

1. A suspension system for a vehicle, comprising:

a first hydraulic circuit with a first hydraulic cylinder operatively coupleable to a first side of the vehicle, the first hydraulic circuit being selectively controllable to move the first side of the vehicle and having a first pressure-controlled counterbalance valve connected to the first hydraulic cylinder;

a second hydraulic circuit with a second hydraulic cylinder operatively coupleable to a second side of the vehicle, the second hydraulic circuit being selectively controllable to move the second side of the vehicle and having a second pressure controlled-counterbalance valve connected to the second hydraulic cylinder; and a connection between the first hydraulic circuit and the second hydraulic circuit, the connection including a single three-position leveling valve;

wherein the first and second hydraulic cylinders both rise when the leveling valve is in a first position and pressurized fluid is supplied through the leveling valve and each respective counterbalance valve to each respective hydraulic cylinder, wherein the first and second hydraulic cylinders both lower when the leveling valve is in a second position and pressurized fluid drains from each cylinder through each respective counterbalance valve and through the leveling valve, and wherein the first hydraulic circuit and the second hydraulic circuit are isolated from and operate independently of each other when the leveling valve is in a third position.

2. The suspension system of claim 1, wherein the first and second hydraulic cylinders are each connectible to respective ends of a common axle on the vehicle.

3. The suspension system of claim 1, wherein the first hydraulic circuit includes a first accumulator connected to the first hydraulic cylinder, and the second hydraulic circuit includes a second accumulator connected to a second hydraulic cylinder.

4. The suspension system of claim 3, wherein the first accumulator is connected to a first check valve and the second accumulator is connected to a second check valve.

5. The suspension system of claim 1, wherein the leveling valve is positioned on a first line and the connection includes a second line extending between the first and second hydraulic circuits, the second line having respective first and second check valves positioned in back-to-back relationship to each other.

6. The suspension system of claim 5, further comprising a common drain line operable to drain the system, the common drain line extending from the second line at a point between the first and second check valves.

7. The suspension system of claim 6, further comprising a pressure bleeddown valve positioned on the common drain line.

8. The suspension system of claim 1, wherein the connection extends between the first and second counterbalance valves.

9. The suspension system of claim 1, further comprising a height sensor that detects a suspension height of the vehicle and moves the leveling valve among the first, second and third positions based on the detected suspension height.

10. The suspension system of claim 9, wherein the height sensor has a first end connectible to an axle of the vehicle and a second end connectible to a body of the vehicle.

11. A method of adjusting a height of a vehicle, the vehicle having a body, at least one axle and a suspension system that suspends the body over the at least one axle, the suspension system having:

a first hydraulic circuit including a first hydraulic cylinder coupled to the axle and to a first side of the body, and a first counterbalance valve connected to the first hydraulic cylinder, a second hydraulic circuit including a second hydraulic cylinder coupled to the axle and a second side of the body, and a second counterbalance valve connected to the second hydraulic cylinder, and a three-position leveling valve positioned on a line connecting the first and second hydraulic circuits, the leveling having a first neutral position, a second lowering position and a third raising position, the method comprising:

moving the leveling valve from the neutral position to either the lowering position or the raising position, thereby connecting the first and second counterbalance valves together;

adjusting the pressure of working fluid within the suspension system to respectively lower or raise the body of the vehicle with the first hydraulic cylinder and the second hydraulic cylinder acting together; and returning the leveling valve to the neutral position to thereby disconnect the first counterbalance valve and the second counterbalance valve from each other when a desired vehicle height is reached.

12. A kit for reconfiguring an original suspension system for a vehicle into a two-mode suspension system, the original suspension system comprising at least a first hydraulic cylinder and a second hydraulic cylinder, each connected to a common axle and to respective first and second sides of the vehicle, a suspension height sensor that detects a height of the suspension system, a three-position leveling valve coupled to the suspension height sensor, and to the first hydraulic cylinder and the second hydraulic cylinder, the leveling valve controlling the height of the body based on the suspension height information, the kit comprising:

a first pressure-controlled counterbalance valve connectible to the first hydraulic cylinder and the leveling valve, and a second pressure-controlled counterbalance valve connectible to the second hydraulic cylinder and the leveling valve;

a first check valve connectible to the first hydraulic cylinder and a second check valve connectible to the second hydraulic cylinder;

wherein the leveling valve is selectively actuatable to connect the first counterbalance valve and the second counterbalance valve and to join the first hydraulic circuit and the second hydraulic circuit in a first mode, and to isolate the first hydraulic circuit and the second hydraulic circuit from each other in a second mode.

13. A suspension system for a vehicle, comprising:

a first hydraulic circuit operatively coupleable to a first side of the vehicle, the first hydraulic circuit being selectively controllable to move the first side of the vehicle, the first hydraulic circuit comprising a first hydraulic cylinder having a body end that attaches to the first side of the vehicle and an axle end that attaches to a common axle of the vehicle, a first accumulator connected to the first hydraulic cylinder and a first check valve connected to the first accumulator;

a second hydraulic circuit operatively coupleable to a second side of the vehicle, the second hydraulic circuit being selectively controllable to move the second side of the vehicle, the second hydraulic circuit comprising a second hydraulic cylinder having a body end attached to the second side of the body and an axle end attached to the common axle, a second accumulator attached to the second hydraulic cylinder, a second check valve attached to the second accumulator; and a connection between the first hydraulic circuit and the second hydraulic circuit, wherein the first hydraulic circuit and the second hydraulic circuit operate together in a first mode when the connection between the first hydraulic circuit and the second hydraulic circuit is open to move the first and second sides of the vehicle in a same direction, wherein the first hydraulic circuit and the second hydraulic circuit operate independently of each other in a second mode when the connection is closed, and wherein the first check valve and the second check valve are arranged in a back-to-back relationship with a common drain line extending downstream, thereby allowing the first accumulator and the second accumulator to be drained by alternatingly depressurizing the first accumulator and the second accumulator.

14. The suspension system of claim 13, further comprising a pressure bleeddown valve connected to and positioned downstream of the first check valve and the second check valve.

* * * * *